H. F. HITNER.
PROCESS FOR LADLING GLASS.
APPLICATION FILED JUNE 30, 1919.
1,342,960.
Patented June 8, 1920.
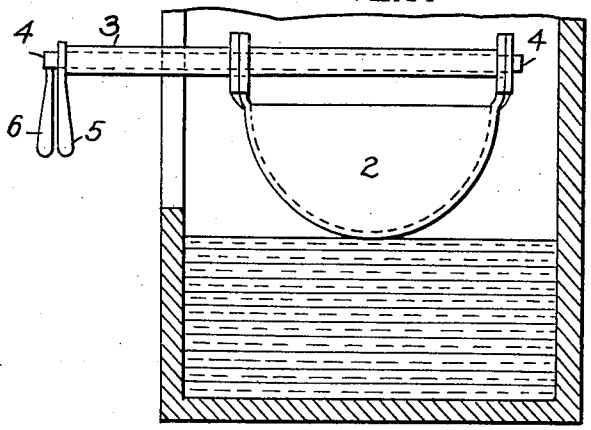
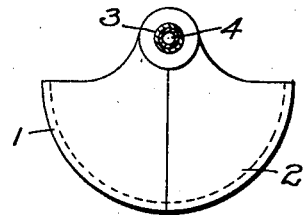
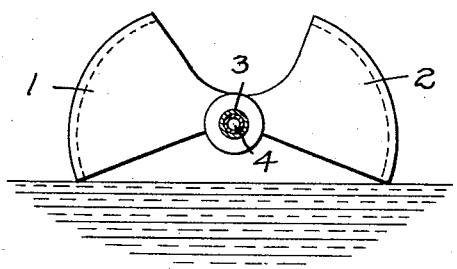
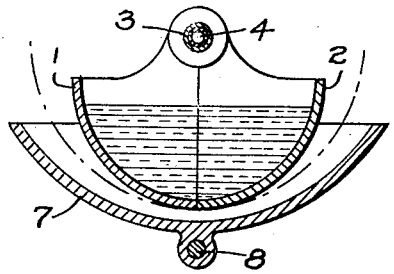
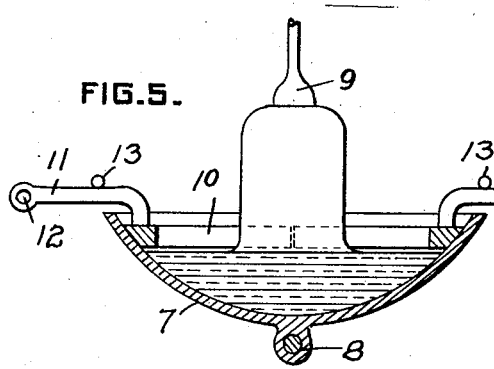
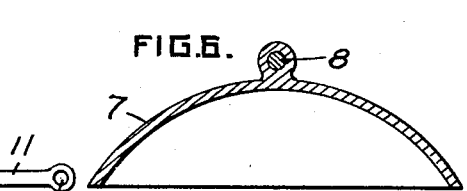
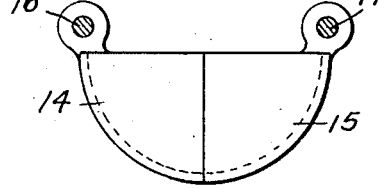
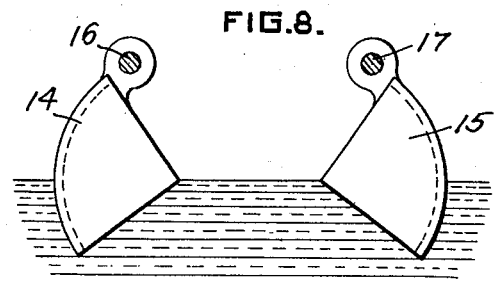
INVENTOR
Harry F. Hitner.
by atty.
James C. Bradley.

UNITED STATES PATENT OFFICE.

HARRY F. HITNER, OF WILKINSBURG, PENNSYLVANIA, ASSIGNOR TO PITTSBURGH PLATE GLASS COMPANY, A CORPORATION OF PENNSYLVANIA.

PROCESS FOR LADLING GLASS.

1,342,960.     Specification of Letters Patent.     Patented June 8, 1920.

Application filed June 30, 1919. Serial No. 307,725.

*To all whom it may concern:*

Be it known that I, HARRY F. HITNER, a citizen of the United States, and a resident of Wilkinsburg, in the county of Allegheny and State of Pennsylvania, have made a new and useful Invention in Processes for Ladling Glass, of which the following is a specification.

The invention relates to an improvement for ladling glass to be used for a variety of purposes and for drawing the glass in case it is to be made into sheets. The invention has for its principal objects; the provision of an improved process whereby the glass may be ladled and subsequently handled with the least possible disturbance of the body of glass so handled; the provision of a process whereby the body of glass is kept from cooling too rapidly after the ladling and during the drawing operation; and the provision of a process whereby the adhesion of the glass to the pot to which it is transferred is prevented, so that all the waste glass remaining in the pot after the drawing operation can be dumped, rendering the pot ready for reuse without reheating to melt out the waste glass as has heretofore been the practice. The practice of the invention is illustrated diagrammatically in the accompanying drawing, wherein:

Figure 1 is a side elevation showing the ladle preferably employed in position above a body of glass, from which it is desired to ladle. Fig. 2 is an end elevation of the ladle in closed position. Fig. 3 is an end elevation of the ladle in the open position occupied just before engaging a body of glass. Fig. 4 is a sectional view through the ladle and the pot to which the glass is to be transferred for drawing, the ladle occupying its position just before opening to deposit the glass in the pot. Fig. 5 is a section through the pot illustrating the drawing operation. Fig. 6 shows the pot in inverted position for dumping the waste glass after a drawing operation, and Figs. 7 and 8 are side elevations of a modified form of ladle which may be employed.

The ladle which is employed is preferably made in two parts hinged together, although a greater number of parts might be employed if desired. This ladle is placed close to the molten glass in open position and then closed, the two parts of the ladle encircling the body of glass, which forms the contents of the ladle after the closing operation is completed. The ladle is preferably made of iron and is inserted in the glass when in a cold condition so that the glass taken up by the ladle is chilled next to the metal of the ladle, thus forming what may be termed a ladle skin. This ladle skin hardens into a plastic or semi-solid condition, so that it does not adhere to the ladle and forms an insulating container for the body of molten glass, in this manner retarding the further cooling of the glass. This formation of the ladle skin also prevents the adhesion of the glass to the ladle.

The ladle with its glass content is carried by means of a crane to a drawing pot, which is also preferably of metal, and after the ladle is lowered close to the bottom of the pot, the two parts thereof are swung apart, allowing the glass to pass into the pot. This operation is accomplished with great care and with the ladle very close to the bottom of the pot when the opening occurs, so that the transfer of the glass occurs with as little shock or jar as possible. When the operation is properly conducted, the ladle skin is not ruptured during the transfer, so that there is substantially no disturbance of the glass inside of such ladle skin. This ladle skin lies against the cool surface of the pot and is further cooled thereby, so that there is no adhesion to the pot. The glass is thus transferred into the pot from the melting tank with the least possible amount of disturbance or agitation, so that it is substantially free from bubbles and strings, such as are otherwise formed in the regular ladling of glass.

An article such as a cylinder or sheet of glass may be drawn from the pot in the usual way and during this operation it is desirable to provide means for holding the body of glass in the pot as the latter part of the drawing operation approaches, since the body of glass is not adherent to the pot and the pull of the drawing operation tends to lift the body out of the pot. After the drawing operation is completed and the article is cut off, the pot is then inverted and the ladle skin with a slight amount of waste glass therein, left after the drawing operation, drops out, the pot being perfectly clean and requiring no further melting out or heating in order to clean it, such as has heretofore been considered necessary.

The ladle employed is preferably of the construction illustrated in Figs. 1, 2 and 3, Fig. 1 illustrating the ladle in position above a body of glass from which it is desired to ladle, while Fig. 3 illustrates the ladle in end elevation in open position. From this illustration it will be seen that the ladle comprises two jaws, 1 and 2, pivoted together and capable of opening approximately 180 degrees. These jaws are supported upon a pipe 3, through which extends a shaft 4, such members being provided respectively with the turning handles 5 and 6. The section 1 has its right hand end keyed to the shaft 4, while the right hand end of the section 2 is keyed to the pipe 3, so that by turning the handles 5 and 6, the sections can be swung open and shut. The other ends of the sections 1 and 2 are pivoted upon the pipe.

When it is desired to take up a ladle full of glass, the ladle is opened as indicated in Fig. 3 and brought close to the surface of the glass, after which it is allowed to close, thus dipping out a body of glass. The bottom walls of the ladle sections cut through the glass on arcs, so that there is a minimum amount of disturbance in the glass during the closing operation. The jaws preferably swing on the arc indicated in dot and dash lines in Fig. 4, as there is less disturbance of the glass in the ladle when the jaws swing on this arc than when they swing on an arc corresponding to the curvature of the walls of the ladle. After the ladle is filled with glass, it is lifted, preferably by means of a crane, and carried to the position indicated in Fig. 4, over the reversible pot 7, this pot being pivotally mounted at 8 in order to permit the pot to be turned upside down to dump the waste glass after the drawing operation. After the ladle is brought into the position indicated at Fig. 4, it is opened and the glass deposited with the least possible amount of disturbance in the pot. As heretofore explained, the ladle is used cold, so that a skin of cold glass is formed next to the metal and this ladle skin acts as an insulator for the body of glass in the ladle and prevents any disturbance of the glass when it is transferred to the pot, care being exercised to deposit the ladle skin intact with its contents of glass, so that there is no flowing action in the ladle of glass during the transfer from the ladle to the pot. A body of glass is thus secured which is free from bubbles and strings.

After the ladle is removed the glass may be drawn from the pot, as indicated in Fig. 5. If a cylinder is to be drawn, a hollow bait 9 is employed, which is dipped into the glass and then raised slowly to form a cylinder, the method of such formation being well known in the art and requiring no further description. As the end of the draw approaches there is a tendency to lift the body of glass in the pot from its position, and in order to prevent any upward movement, a holding device is preferably employed, such holding device comprising a pair of semi-circular members 10, mounted pivotally upon arms 11, pivoted at 12, so that such members can be swung out of the way after the drawing operation, when it is desired to invert the pot for dumping the ladle skin and waste glass. The arms are held against upward movement by suitable locking means such as the pins 13. After the drawing operation is completed, the pot is inverted to the position illustrated in Fig. 6, and the ladle skin and waste glass drops out, thus avoiding the necessity of any recleaning of the pot by heating or scraping operation, such as has heretofore been found necessary.

In some cases it may be found desirable to draw direct from the ladle instead of ladling the glass into a pot and then drawing from the pot. In such case the ladle construction illustrated in Figs. 7 and 8 is preferably employed, since with the other type of ladle the pipe 3 would interfere with the drawing operation. In the type of ladle shown in Figs. 7 and 8, the two parts 14 and 15 are pivoted at 16 and 17 to a portable frame (not shown) so that the space above the ladle is open and there is no interference in case it is desired to draw direct from this ladle. The ladle sections swing as indicated in Fig. 8.

The process of ladling may be advantageously employed in other cases than the one described, as, for instance, in the making of optical glass in a tank, in which case the glass would be ladled out and deposited in a sand mold and allowed to harden. This ladling procedure is especially advantageous in this connection because of the desirability of avoiding defects in optical glass, such as are due to the disturbance of the glass. The glass might also be ladled and gathered for the formation of the articles in pressing or other operations. If desired, the surface of the ladle coming in contact with the glass may be coated, as, for instance, by lime, which would retard the radiation of heat from the body of glass, thus tending to maintain the heat in the glass in the ladle. Such coating would also act as an insulator to a certain extent and reduce the tendency of the glass to stick to the metal.

What I claim is:

1. A process of ladling glass from a body of molten glass which consists in dipping the glass from a body of molten glass in a metal ladle so that the glass next to the ladle is chilled, forming a plastic skin or pocket, and then depositing such pocket with its content of molten glass in a receptacle with said pocket intact and in contact with the wall of said receptacle and still carrying its content of molten glass.

2. A process of ladling glass from a body of molten glass which consists in dipping the glass from a body of molten glass in a metal ladle so that the glass next to the ladle is chilled, forming a plastic skin or pocket, depositing such pocket with its content of molten glass in a receptacle with said pocket intact and in contact with the walls of said receptacle and still carrying its content of molten glass, and drawing a glass article from said molten glass in the pocket.

3. A process of ladling glass from a body of molten glass which consists in dipping the glass from a body of molten glass in a metal ladle so that the glass next to the ladle is chilled, forming a plastic skin or pocket, depositing such pocket with its content of molten glass in a receptacle with said pocket intact and in contact with the walls of said receptacle and still carrying its content of molten glass, drawing a glass article from said molten glass in the pocket, and then inverting the pot and dumping the pocket with the waste glass remaining therein.

4. A process of ladling glass from a bath of molten glass which consists in dipping into said glass with a metal ladle consisting of a plurality of parts which move toward each other and engage beneath the surface of the glass to inclose a body of glass which has its outer walls chilled by the ladle into a plastic skin forming a pocket or container, removing the ladle from the glass to a position in close proximity to the bottom of a receptacle, and opening the ladle and depositing the said pocket or container in the pot intact with said body of molten glass still in said container or pocket.

5. A process of ladling glass from a bath of molten glass which consists in dipping into said glass with a metal ladle consisting of a plurality of parts which move toward each other and engage beneath the surface of the glass to inclose a body of glass which has its outer walls chilled by the ladle into a plastic skin forming a pocket or container, removing the ladle from the glass to a position in close proximity to the bottom of a receptacle, opening the ladle and depositing the said pocket or container in the pot intact with said body of glass still in said container or pocket, and drawing a glass article from the glass in the pot.

6. A process of ladling glass from a bath of molten glass which consists in dipping into said glass with a metal ladle consisting of a plurality of parts which move toward each other and engage beneath the surface of the glass to inclose a body of glass which has its outer walls chilled by the ladle into a plastic skin forming a pocket or container, removing the ladle from the glass to a position in close proximity to the bottom of a receptacle, opening the ladle and depositing the said pocket or container in the pot intact with said body of molten glass still in said container or pocket, drawing a glass article from the glass in the pot, and finally inverting the pot and dumping therefrom the said pocket or container with the waste glass remaining therein.

In testimony whereof, I have hereunto subscribed my name this 25th day of June, 1919.

HARRY F. HITNER.